(12) United States Patent
Park et al.

(10) Patent No.: US 10,409,249 B2
(45) Date of Patent: Sep. 10, 2019

(54) METHOD FOR CONTROLLING POWER SUPPLY AND ELECTRONIC DEVICE IMPLEMENTING THE SAME

(71) Applicant: Samsung Electronics Co., Ltd., Suwon-si, Gyeonggi-do (KR)

(72) Inventors: Junghoon Park, Incheon (KR); Jinwoo Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 593 days.

(21) Appl. No.: 15/156,962

(22) Filed: May 17, 2016

(65) Prior Publication Data

US 2016/0342143 A1 Nov. 24, 2016

(30) Foreign Application Priority Data

May 18, 2015 (KR) .................. 10-2015-0068963

(51) Int. Cl.
*G05B 19/042* (2006.01)
*H02H 5/08* (2006.01)

(52) U.S. Cl.
CPC ......... *G05B 19/0428* (2013.01); *H02H 5/083* (2013.01); *Y02B 70/3241* (2013.01); *Y04S 20/227* (2013.01)

(58) Field of Classification Search
None
See application file for complete search history.

(56) References Cited

U.S. PATENT DOCUMENTS

| 4,135,186 | A | * | 1/1979 | Minorikawa | ......... | G01F 23/247 |
| | | | | | | 340/450.3 |
| 8,550,331 | B2 | | 10/2013 | Smith et al. | | |
| 2012/0106017 | A1 | * | 5/2012 | Schumacher | ............. | B60L 3/04 |
| | | | | | | 361/114 |
| 2014/0300489 | A1 | * | 10/2014 | Rice | ........................ | H04Q 9/00 |
| | | | | | | 340/870.02 |

FOREIGN PATENT DOCUMENTS

WO    WO 2013040657 A1  *  3/2013  ............... H04Q 9/00

* cited by examiner

*Primary Examiner* — Thienvu V Tran
*Assistant Examiner* — David M Stables
(74) *Attorney, Agent, or Firm* — Jefferson IP Law, LLP

(57) ABSTRACT

An electronic device for controlling a power supply is provided. The electronic device includes a power unit configured to supply power, a power management unit configured to receive a supply of power from the power unit and to distribute the supplied power, a flood sensing unit connected to the power unit and located in a part of the electronic device most subject to flooding or fluid penetration, and a power control switch configured to, if a voltage level of the flood sensing unit is a first level indicating no detected flooding or fluid penetration, electrically connect the power unit and the power management unit to each other, and if the voltage level of the flood sensing unit is a second level indicating a detected flooding or fluid penetration, interrupt an electrical connection between the power unit and the power management unit.

19 Claims, 16 Drawing Sheets

METHOD FOR CONTROLLING POWER SUPPLY AND ELECTRONIC DEVICE IMPLEMENTING THE SAME

CROSS-REFERENCE TO RELATED APPLICATION(S)

This application claims the benefit under 35 U.S.C. § 119(a) of Korean patent application filed on May 18, 2015 in the Korean Intellectual Property Office and assigned Serial number 10-2015-0068963, the entire disclosure of which is hereby incorporated by reference.

TECHNICAL FIELD

The present disclosure relates to a method for controlling a power supply and an electronic device implementing the same, which can control the power supply to the electronic device after determination of a flooding or liquid penetration of the electronic device.

BACKGROUND

As the use of electronic devices has sharply increased, a case where the electronic device is exposed to various situations for malfunctions or damage to the extent that its operation is not possible has also increased. As an example, if power is supplied to an electronic device by a user after flooding or liquid penetration of the electronic device, internal components of the electronic device may be damaged.

In the related art, a flooding label is typically attached or a humidity sensor is provided in an electronic device to determine flooding or liquid penetration of the electronic device and thus, it becomes possible to prevent the components of the electronic device from being damaged in the case of flooding or liquid penetration of the electronic device.

The flood label is used to confirm the flooding state of the electronic device after occurrence of the flooding or liquid penetration of the electronic device. In contrast, the humidity sensor is used by a control unit to determine whether the flooding or liquid penetration of the electronic device has occurred, and the power supply to the electronic device can be interrupted according to the result of the determination.

However, such a method implemented through the use of a humidity sensor may not be performed in the case where a sensor hub or the control unit for controlling the humidity sensor is also flooded. Further, even in the case where the sensor hub or the control unit is not flooded and thus it is possible to intercept the power using the humidity sensor, power may be supplied to the circuit of the electronic device through a user operation (e.g., pressing of a power button) even after the interception, and thus it may not be possible to prevent the flooded circuit from being damaged.

The above information is presented as background information only, and to assist with an understanding of the present disclosure. No determination has been made, and no assertion is made, as to whether any of the above might be applicable as prior art with regard to the present disclosure.

SUMMARY

Aspects of the present disclosure are provided to address at least the above-mentioned problems and/or disadvantages, and to provide at least the advantages described below. Accordingly, an aspect of the present disclosure is to provide a structure and a circuit provided in a part of an electronic device to sense a flooding or liquid penetration of the electronic device, and thus a circuit of the electronic device and a battery power can be interrupted during or after the flooding. Further, a power supply by a user can also be intercepted during or after the flooding.

In accordance with an aspect of the present disclosure, an electronic device is provided. The electronic device includes a power unit to supply power and a signal corresponding to the power, a power management unit to receive a supply of power from the power unit and distribute the supplied power, a flood sensing unit connected to the power unit and located in the electronic device, and a power control switch to electrically connect the power unit and the power management unit to each other if a voltage level of the flood sensing unit is a first level as indicated by an input of a signal corresponding to the first level, and interrupt an electrical connection between the power unit and the power management unit if the voltage level of the flood sensing unit is a second level as indicated by an input of a signal corresponding to the second level.

In accordance with another aspect of the present disclosure, an electronic device for controlling a power supply is provided. The electronic device includes a power unit to supply power and a signal corresponding to the power, a power management unit to receive a supply of power from the power unit and distribute the supplied power, a power sensing unit connected to the power unit, a disassembly sensing unit to sense a disassembly of at least a part of the electronic device, and a flood sensing circuit to receive an input of signals from the power sensing unit and the disassembly sensing unit and determine the power supply to the electronic device based on the signals.

In accordance with another aspect of the present disclosure, a method for controlling a power supply to an electronic device is provided. The method includes confirming whether the electronic device is flooded and if a flood of the electronic device is confirmed, deactivating the power supply, sensing whether at least a part of the electronic device is disassembled and if a disassembly of the at least a part of the electronic device is sensed, activating the power supply, and if the power supply is activated, confirming whether a power button is input and if the power button is input, performing the power supply to the electronic device.

According to various aspects of the present disclosure, the electronic device can sense the flooding or liquid penetration situation using the flood sensing unit and the flood sensing circuit, and can interrupt the power supply from the battery to the circuit of the electronic device when a flood situation is sensed.

According to various aspects of the present disclosure, power that may be supplied to the electronic device by the user after the flooding or liquid penetration situation is sensed can be interrupted. Accordingly, an electric leak or short of the circuit that may occur during the power supply after the flooding or liquid penetration situation can be prevented from occurring, and thus the components of the electronic device can be prevented from being damaged.

According to various aspects of the present disclosure, the flooding or liquid penetration situation can be sensed even in various situations through the configuration of the flood sensing unit having a structure that facilitates the flood sensing.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
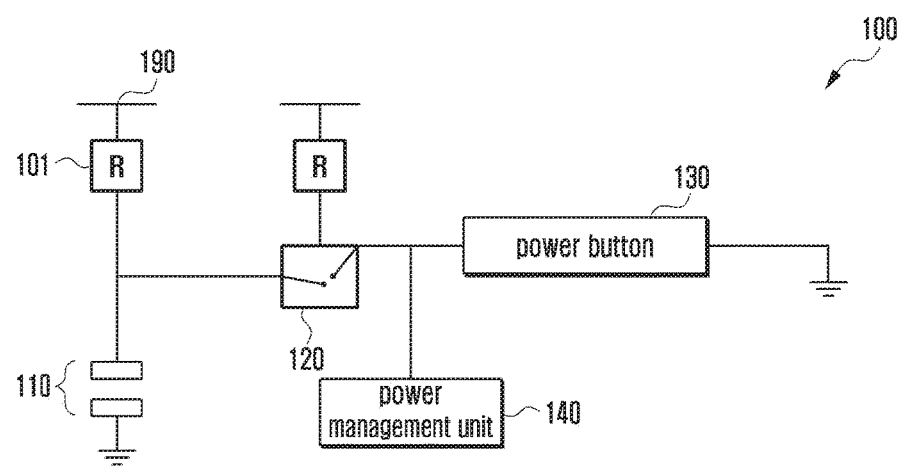
FIG. 1A is a circuit diagram of an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the spirit and scope of the present disclosure. In addition, descriptions of well-known functions and constructions may be omitted for clarity and conciseness.

The terms and words used in the following description and claims are not limited to the bibliographical meanings, but are merely used to enable a clear and consistent understanding of the present disclosure. Accordingly, it should be apparent to those skilled in the art that the following description of various embodiments of the present disclosure is provided for illustration purpose only, and not for the purpose of limiting the present disclosure as defined by the appended claims and their equivalents.

It will be understood that the expressions "comprises" and "may comprise" is used to specify presence of disclosed functions, operations, components, and the like, but do not preclude the presence of one or more additional, different or combined functions, operations, components, and the like. It will be further understood that the terms "comprises" and/or "has" when used in this specification, specify the presence of stated features, numbers, operations, components, elements, or combinations thereof, but do not preclude the presence or addition of one or more other features, numbers, operations, components, elements, or combinations thereof. In the present disclosure, the expression "and/or" is taken as specific disclosure of each and any combination of enumerated things. For example, A and/or B is to be taken as specific disclosure of each of A, B, and A and B.

As used herein, terms such as "first," "second," "third" and so forth, are used to describe various components, however, it should be obvious that the components should not be defined by these terms. For example, the terms do not restrict the order and/or importance of the corresponding components. The terms are used only for distinguishing one component from another component. For example, a first component may be referred to as a second component and likewise, a second component may be referred to as a first component, without departing from the teaching of the inventive concept.

It will be understood that when an element or layer is referred to as being "on", "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

The terminology used herein is for the purpose of describing particular embodiments only, and is not intended to be limiting of the disclosure. As used herein, the singular forms "a", "an", and "the", are intended to include the plural forms as well, unless the context clearly indicates otherwise. Thus, for example, reference to "a component surface" includes reference to one or more of such surfaces.

Unless otherwise defined herein, all terms including technical or scientific terms used herein have the same meanings as commonly understood by those skilled in the art to which the present disclosure belongs. It will be further understood that terms, such as those defined in commonly used dictionaries, should be interpreted as having a meaning that is consistent with their meaning in the context of the specification and relevant art, and should not be interpreted in an idealized or overly formal sense unless expressly so defined herein.

The specification may make reference to an "electronic device" for various purposes. Examples of the electronic device may include a smartphone, table personal computer (PC), mobile phone, video phone, electronic book (e-book) reader, desktop PC, laptop PC, netbook computer, personal digital assistant (PDA), portable multimedia player (PMP), Moving Picture Experts Group phase 1 or phase 2 (MPEG-1 or MPEG-2) audio layer 3 (MP3) player, mobile medical appliance, camera, wearable device (e.g., head-mounted device (HMD) such as electronic glasses, electronic clothing, electronic bracelet, electronic necklace, electronic accessory, electronic tattoo, smartwatch, and the like.

According to an embodiment of the present disclosure, the electronic device may also be one or more of a smart home appliance having operation support functions. Examples of the smart electronic appliance as an electronic device may include a television, digital versatile disc (DVD) player, audio player, refrigerator, air-conditioner, vacuum cleaner, electronic oven, microwave oven, laundry machine, air cleaner, set-top box, TV box (e.g., Samsung Home-Sync™, Apple TV™, and Google TV™), game console, electronic dictionary, electronic key, camcorder, electronic frame, and the like.

According to an embodiment of the present disclosure, examples of the electronic device may also include a medical device (e.g., magnetic resonance angiography (MRA), magnetic resonance imaging (MRI), computed tomography (CT), Navigation device, global positioning system (GPS) receiver, event data recorder (EDR), flight data recorder (FDR), car infotainment device, maritime electronic device (e.g., maritime navigation device and gyro compass), aviation electronic device (avionics), security device, vehicle head unit, industrial or home robot, automatic teller's machine (ATM) of financial institution, point of sales (POS), and the like.

According to an embodiment of the present disclosure, examples of the electronic device may also include furniture and building/structure having a communication function, electronic board, electronic signature receiving device, projector, and metering device (e.g., water, electric, gas, and electric wave metering devices). According to various embodiments of the present disclosure, the electronic device may be any combination of the aforementioned devices. According to various embodiments of the present disclosure, the electronic device may also be a flexible device for implementation as any of the aforementioned devices. It should be obvious to those skilled in the art that the electronic device is not limited to the aforementioned devices.

FIG. 1A is a circuit diagram of an electronic device according to various embodiments of the present disclosure.

Figure 1B:
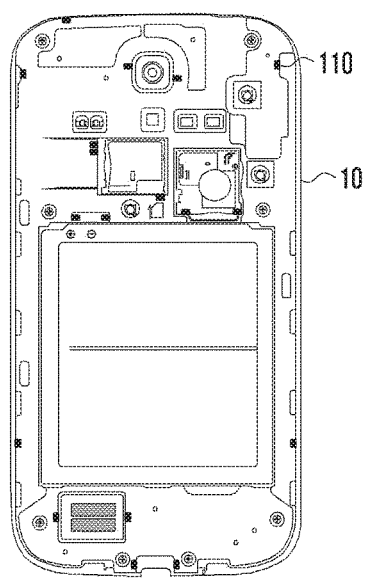
FIG. 1B is a view illustrating an electronic device mounted with a flood sensing unit according to various embodiments of the present disclosure.

FIG. 1B is a view illustrating an electronic device mounted with a flood sensing unit according to various embodiments of the present disclosure.

Referring to FIG. 1A, an electronic device 100 may include a flood sensing unit 110, a power control switch 120, a power button 130, a power management unit 140, and a power unit 190.

Referring to FIG. 1B, the flood sensing unit 110 may be located on at least one of a part of a housing 10 of the electronic device, a printed circuit board (PCB), an internal support member, or a battery. The flood sensing unit 110 may include at least two conductive elements, and may be located on a part that is vulnerable to flooding or liquid penetration of the electronic device by a material that may permit a detectable electric current flow between the conductive elements (e.g., water). An example of the part or portion that is vulnerable to the flood may be a relatively open portion, such as an earphone jack portion (not illustrated), a speaker portion (not illustrated), a microphone portion (not illustrated), a subscriber identity module (SIM) card insertion portion (not illustrated), or a charging terminal (not illustrated).

According to various embodiments of the present disclosure, in order to increase accuracy in the determination of a flooding or liquid penetration, the electronic device may include a plurality of flood sensing units 110 that are provided inside the electronic device or in a plurality of locations on the surface of the electronic device.

The conductive elements that form a part of the flood sensing unit 110 may have the characteristics that they become electrically connected by the presence of conductive material (e.g., water) associated with flooding or liquid penetration. Accordingly, as the voltage level that is supplied from the power unit 190 is changed due to the electrical connection of the flood sensing unit 110, it becomes possible to determine whether the flood sensing unit 110 is flooded.

According to various embodiments of the present disclosure, a state of the power control switch 120 may be changed according to the voltage level between the terminals of the flood sensing unit 110. For example, in the case where the flood sensing unit 110 is not flooded, i.e., in the case where the flood sensing unit 110 is not electrically connected (i.e., opened), the voltage level that is supplied from the power unit 190 to the power control switch 120 may be set to a first level, and a signal corresponding to the first level may be a high-level signal. Further, in the case where the flood sensing unit 110 is flooded, i.e., in the case where the flood sensing unit 110 is electrically connected (i.e., shorted), the voltage level that is input to the power control switch 120 may be set to a second level, and a signal corresponding to the second level may be a low-level signal.

In various embodiments of the present disclosure, it may be assumed that in the case where the flood sensing unit 110 is flooded to be electrically connected (i.e., shorted), the power control switch receives the low-level signal, whereas in the case where the flood sensing unit 110 is not flooded or is dried after the flooding to again be electrically opened, the power control switch receives the high-level signal.

The power button 130 may be a switch that senses a user input for supplying power to the electronic device. The power button 130 may be implemented by a physical or mechanical switch of the electronic device, or may be implemented using a sensor (e.g., a pressure sensor, temperature sensor, infrared (IR) sensor, illumination sensor, grip sensor, touch sensor, or fingerprint sensor). Further, the power button 130 may be a soft button that is implemented by an image or an object that is displayed on a display.

If the user input is sensed through the power button 130, a signal corresponding to the sensed input may be input to the power management unit 140, and in response to the input signal, the power management unit 140 may supply power to at least a partial circuit of the electronic device (e.g., an application processor (AP), camera, display, or sensor).

The power may be, for example, power that is supplied from at least one of a battery, external wire or wireless charging device, and an auxiliary battery pack, and the power unit 190 may supply the power to the components in the electronic device using the supplied power.

In various embodiments of the present disclosure, a pull-up resistor 101 may be provided in a location that is close to the power unit 190 to minimize leak current when the flood sensing unit 110 is electrically connected. The pull-up resistor 101 may have a resistance value that is relatively larger than the resistance values of other resistors that constitute the electronic device. For example, the pull-up resistor 101 may be a resistor having the resistance value of 1 M ohm. Further, in order to prevent an electrical short during flooding, a flood prevention process may be performed with respect to the pull-up resistor 101. The flood prevention process may be implemented by spreading a protective material upon elements that is not affected by flooding, for example, a resin application process. The reason why the flood prevention process is performed with respect to the pull-up resistor 101 is to prevent the pull-up resistor 101 from being electrically shorted when the electronic device is flooded.

FIGS. 2A to 2D are circuit diagrams of an electronic device according to various embodiments of the present disclosure.

Referring to FIGS. 2A to 2D, an electronic device may include a flood sensing circuit 200 including a first switch 202, a second switch 203, a logic operation unit (e.g., (OR) gate) 204, a flood sensing unit 210, a power control switch 220, a power button 230, a power management unit 240, a disassembly sensing unit 250, and a power unit 290. A pull-up resistor 201 may be provided in a location that is close to the power unit 290 to minimize leak current when the flood sensing unit 210 is electrically connected. Similar resistors 205 and 206 may be provided in a location that is close to powers supplies 291 and 292, respectively.

Figure 2A:
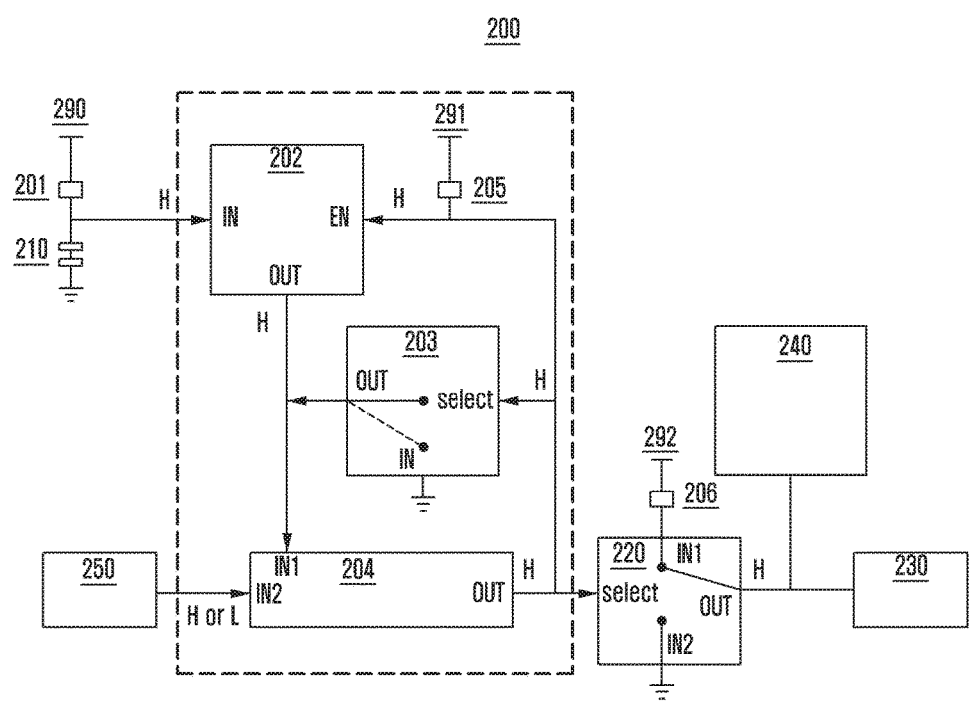
FIGS. 2A to 2D are circuit diagrams of an electronic device according to various embodiments of the present disclosure.

Referring to FIG. 2A, the electronic device is not flooded and operates in a normal state. The first switch 202 may receive an input of a signal related to a voltage from the power unit 290. For example, in the case where the electronic device (e.g., 601 of FIG. 6) is not flooded and the flood sensing unit 210 is not electrically connected (i.e., opened), the first switch 202 may receive an input of a high-level signal that corresponds to the first level. The first switch 202 may also receive an input of a high-level signal from a power supply 291 as an enable signal for determining whether to operate the first switch 202. If the enable signal is a high-level signal, the first switch 202 may be in an operation state, and in this case, the first switch 202 may output the high-level signal that is the input signal.

The output signal of the first switch 202 may be input to the logical operation unit 204. The logical operation unit 204 may determine its output through discrimination of the signal that is input from the first switch 202 and the signal that is input from the disassembly sensing unit 250. In a normal operation state, the logical operation unit 204 may receive the high-level signal from the first switch, and may receive the high-level or low-level signal from the disassembly sensing unit. For example, if the disassembly of the electronic device is not sensed, the logical operation unit 204 may receive a low-level signal, whereas if the disassembly of the electronic device is sensed, the logical operation unit 204 may receive a high-level signal.

The disassembly sensing is the sensing of the disassembly of at least a part of the electronic device, and for example, a removal of a battery cover on a rear surface or a side surface of the electronic device, a removal of a fixing portion (e.g., screw or hook structure) for connecting housings of the electronic device or for connecting a housing and an internal structure to each other, or a removal of a support member or a housing that covers at least a partial area of a PCB in the housing.

Figure 2B:
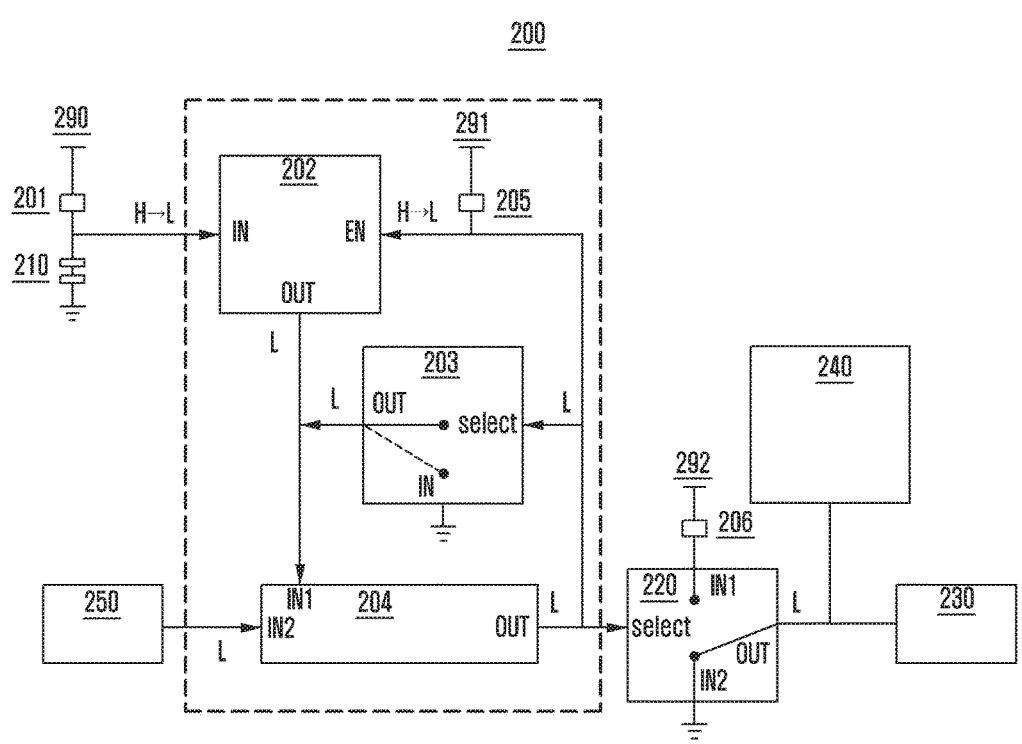
Figure 2C:
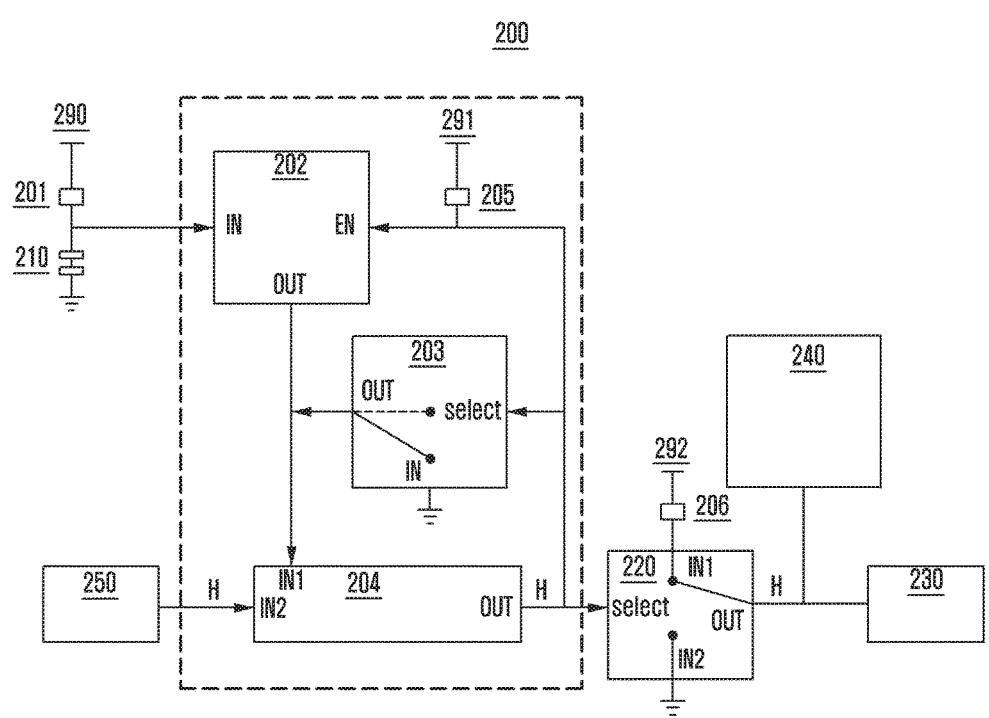
Figure 2D:
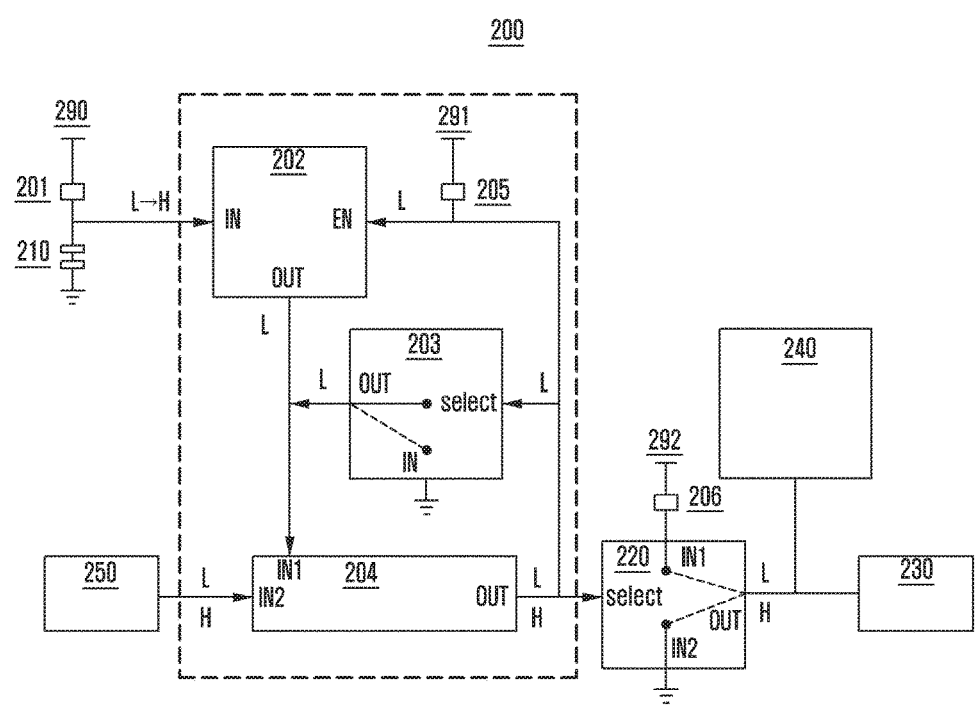
Figure 2E:
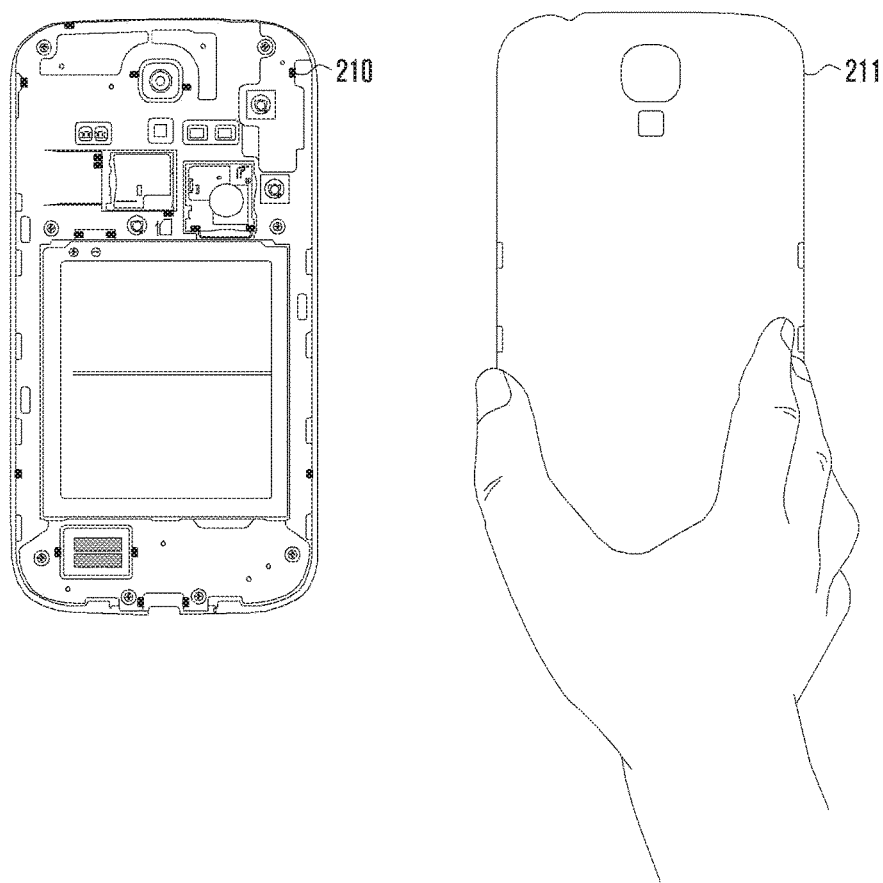
FIGS. 2E to 2G are views illustrating partial disassembly of an electronic device according to various embodiments of the present disclosure.
Figure 2F:
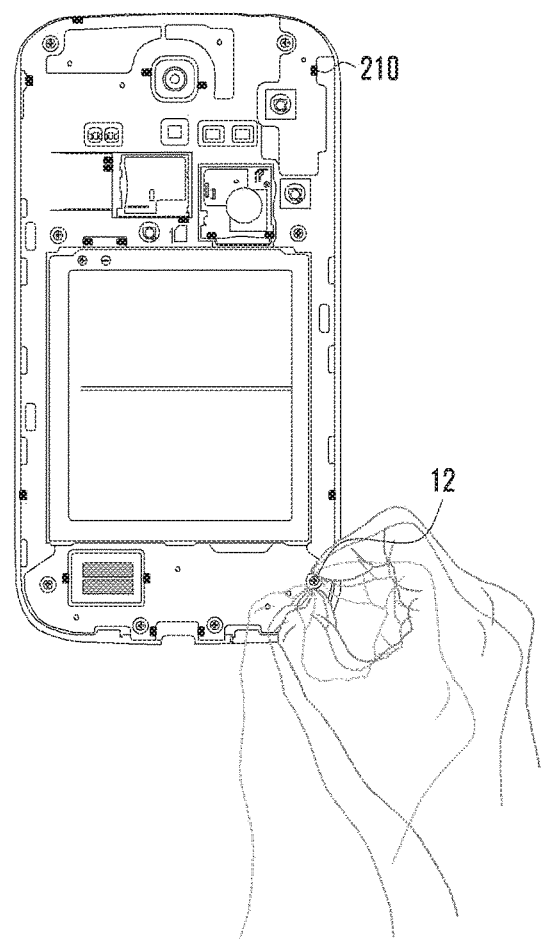
Figure 2G:
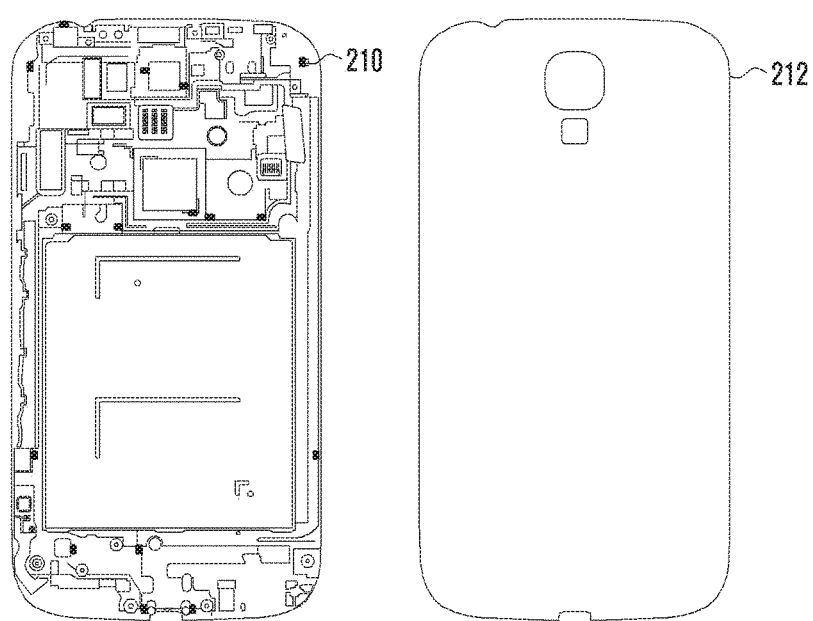

FIGS. 2E to 2G are views illustrating partial disassembly of an electronic device according to various embodiments of the present disclosure.

Referring to FIG. 2E, a view is provided that illustrates a disassembly of an electronic device to which a cover 211 that can be easily separated by a user is applied. For example, the cover 211 may be a detachable battery cover or a flip cover that can cover at least one surface of the electronic device.

Referring to FIG. 2F, a view is provided that illustrates a disassembly of a fixing portion 12 (e.g., screw or hook structure) for fixing at least a part of the electronic device.

Referring to FIG. 2G, a view is provided that illustrates a disassembly of an electronic device to which an integrated cover or housing 212 is applied.

Referring again to FIG. 2A, in a normal operation state, the output signal of the first switch that is input to the logical operation unit 204 is always a high-level signal and thus, the output signal of the logical operation unit 204 may be a high-level signal regardless of the signal that is input from the disassembly sensing device 250. The high-level output signal of the logical operation unit 204 may be input to select the output of the second switch 203. For example, if the output selection input of the second switch 203 is a high-level signal, the output signal thereof may be in a floating state, whereas if the output selection input thereof is a low-level signal, the output signal thereof may be a low-level signal. The output of the second switch 203 may be bridged to the output signal of the first switch 202 and the input of the logical operation unit 204. Since the output of the second switch 203 is in a floating state in the normal operation state, the output of the second switch 203 may not exert an influence on the output signal of the first switch 202 that is input to the logical operation unit 204.

The high-level output signal of the logical operation unit 204 may be input to select the output of the power control switch 220. For example, if the output selection input of the power control switch 220 is a high-level signal, the high-level signal that is input from a power supply 292 may be determined as the output of the power control switch 220. If the output of the power control switch 220 is a high-level signal, an input signal that is generated by the power button 230 may be transferred to the power control device 203. If the output of the power button 230 is transferred to the power control device 203, the power control device may supply the power to at least a part of the electronic device.

FIG. 2B illustrates a circuit configuration in the case where the electronic device is not disassembled in a state where the electronic device is flooded. The first switch 202 may receive an input of a signal related to a voltage from the power unit 290. For example, in the case where the electronic device (e.g., 601 of FIG. 6) is flooded and the flood sensing unit 210 is electrically connected (i.e., shorted), the first switch 202 may receive an input of a low-level signal that is a signal corresponding to the second level. The first switch 202 may receive an input of a high-level signal from a power supply 291 as an enable signal for switch operation. If the input enable signal is a high-level signal, the first switch 202 may be in an operation state and in this case, the first switch 202 may output the low-level signal that is the input signal. The output signal of the first switch 202 may be input to the logical operation unit 204. The logical operation unit 204 may determine its output through discrimination of the signal that is input from the first switch 202 and the signal that is input from the disassembly sensing unit 250. In a state where the electronic device is flooded, the logical operation unit 204 may receive the low-level signal from the first switch, and may receive the high-level or low-level signal from the disassembly sensing unit 250.

In the flooded state, the output signal of the first switch 202 that is input to the logical operation unit 204 is a low-level signal and thus, the output signal of the logical operation unit 204 may be a high-level or low-level signal according to the signal that is input from the disassembly sensing unit 250. For example, in the case where the disassembly of the electronic device is not sensed and thus, the low-level signal is generated from the disassembly sensing unit 250, the output signal of the logical operation unit 204 may be a low-level signal, and this low-level signal may be input as the output selection signal of the second switch 203. If the output selection signal is the low-level signal, the second switch 203 may be determined to output the low-level signal. In this case, the output of the second switch 203 that is bridged to the output of the first switch 202 and the input of the logical operation unit 204 may be a low-level signal and thus, the low-level signal may always be provided to the input of the logical operation unit 204 regardless of the output signal of the first switch 202. Further, the low-level signal that is output from the logical operation unit 204 may be input as the enable signal of the first switch 202. If the input enable signal of the first switch 202 is a low-level signal, the first switch 202 may be deactivated. In this case, the first switch does not operate, and even if the signal that is input from the power supply 290 is changed, the output may maintain the previous state without any change.

The low-level output signal of the logical operation unit 204 may be transferred as the output selection input of the power control switch 220. If the output selection input of the power control switch is a low-level signal, the output thereof may be a low-level signal or may be in a floating state. In this case, even if an input is generated through the power button 230, the generated input may not be transferred to the power management unit 240. That is, the power management unit 240 may not supply the power to the circuit of the electronic device.

FIG. 2C illustrates a circuit configuration in the case where the disassembly of at least a part of the electronic device is sensed in a state where the electronic device is flooded. For example, if the partial disassembly of the electronic device (e.g., 601 of FIG. 6) is sensed, the logical operation unit 204 may receive a high-level signal from the disassembly sensing unit 250. The disassembly sensing may be, for example, sensing of a removal of a battery cover on the rear surface or the side surface of the electronic device, a removal of a fixing portion (e.g., screw or hook structure) for connecting housings of the electronic device or for connecting a housing and an internal structure to each other, or a removal of a support member or a housing that covers at least a partial area of a PCB in the housing. If the high-level signal is received from the disassembly sensing unit 250, the logical operation unit 204 may always determine the high-level signal as its output regardless of the input that is received from the first switch 202 or the second switch 203. The high-level output signal may be input to the power control switch 220 as the output selection signal, and with respect to this input, the power control switch 220 may provide the high-level signal as its output. In this case, the input signal that is generated from the power button 230 may be transferred to the power management unit 240, and the power management unit 240 may supply the power to at least a part of the electronic device.

FIG. 2D illustrates a circuit configuration in the case where the electronic device is dried after being flooded. In the circuit operation during the flooding as described above, if the disassembly of the electronic device is not sensed in the flooded state, the input, output, and enable signals of the first switch 202, the output signal of the second switch 203, and the output signal of the logical operation unit 204 may be low-level signals.

If the flooded electronic device is dried, for example, if the conductive elements of the flood sensing unit 210 are shorted by water and then are opened through removal of the water, the input signal of the first switch may be changed from a low-level signal to a high-level signal. In this case, the enable signal of the first switch 202 continues a low-level state and thus, the first switch maintains a deactivated state. Accordingly, even if the input of the first switch is changed, it does not exert an influence on the output signal thereof. In this case, the low-level signal may be continuously input to the power control switch 220, and the input of the power button 230 may not be transferred to the power management unit 240.

For example, if the disassembly of the electronic device is sensed in a dried state of the electronic device after the flooding, a high-level signal that is output from the disassembly sensing unit 250 may be input to the logical operation unit 204. If the logical operation unit 204 receives the high-level input, the output of the logical operation unit 204 may be determined as the high-level signal regardless of the input that is received from the first switch 202 or the second switch 203. If the high-level signal is output from the OR gate 204, the input of the power button 230 may be transferred to the power management unit 240, and the power management unit 240 may supply the power to the electronic device.

FIGS. 3A to 3D are views of a flood sensing unit according to various embodiments of the present disclosure.

Figure 3A:
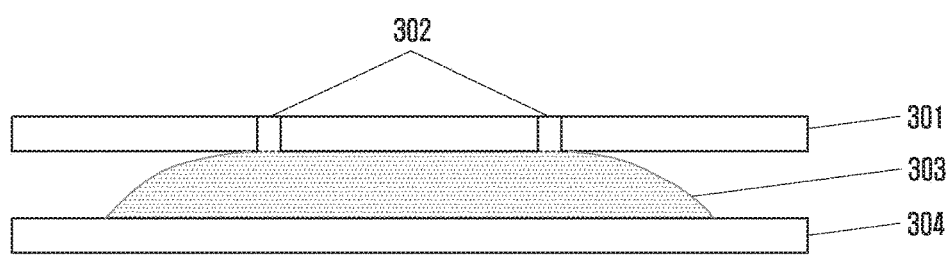
FIGS. 3A to 3D are views of a flood sensing unit according to various embodiments of the present disclosure.

Referring to FIG. 3A, a flood sensing unit 301 may include one or more conductive elements 302. The conductive elements 302 may be electrically connected to each other by a conductive material 303. Here, the conductive material 303 may be, for example, water in the case of flooding or liquid penetration. In various embodiments of the present disclosure, a space in which water is located may be between the flood sensing unit 301 and another flood sensing unit, or between the flood sensing unit 301 and an internal structure (e.g., housing, support member, battery, or PCB) 304 of the electronic device.

For example, if water is located between the flood sensing unit 301 and the internal structure (e.g., housing, support member, battery, or PCB) 304 of the electronic device, at least two of the conductive elements 302 of the flood sensing unit 301 may be electrically connected.

In various embodiments of the present disclosure, the flood sensing unit 301 may be composed of a flexible PCB or a rigid PCB. The flood sensing unit 301 may be located on at least a part of the support member, the housing, the display, and the battery included in the electronic device. Further, as shown in FIG. 3A, at least two conductive elements 302 may be located in one flood sensing unit 301, and one conductive element 302 may be located in different flood sensing units 301, but embodiments are not limited thereto.

Figure 3B:
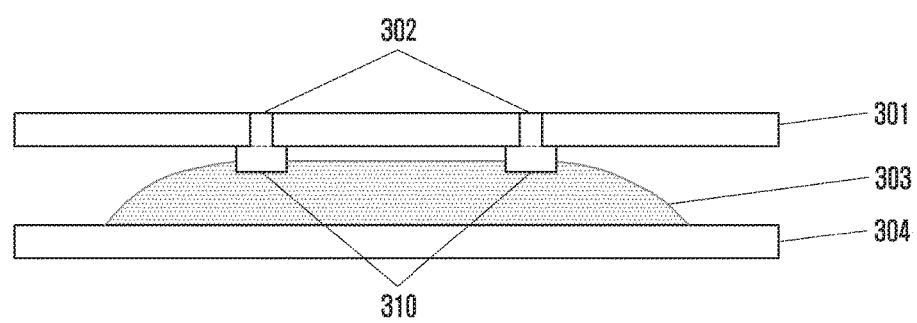

Referring to FIG. 3B, one or more conductive elements 302 may be located in the flood sensing unit 301, and the conductive element 302 may include a projection portion 310 that alters a contact profile shape of the conductive elements 302. The projection portion 310 may be formed through extension of the conductive element 302, and may include a material that is different from the material of the conductive element 302. For example, in the case where the projection portion 310 is made of a material that is different from the material of the conductive element 302, the projection portion 310 may be a resistor, an inductor, a conductive tape, or a gasket.

Figure 3C:
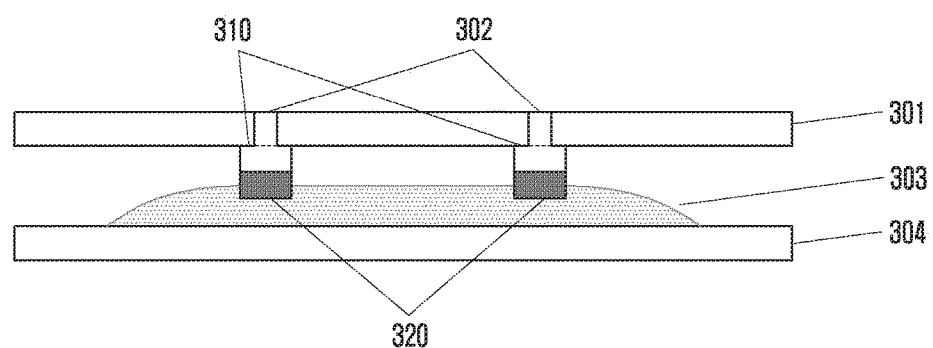

Referring to FIG. 3C, the conductive element 302 may further include a projection portion 320 in addition to the projection portion 310 that is connected to the conductive element 302. The projection portion 320 may be made of the same material as the projection portion 310, and at least a part thereof may include a different material, for example, a resistor, an inductor, a conductive tape, or a gasket. If a conductive material 303, for example, water, is located between the flood sensing unit 301 and the internal structure (e.g., housing, support member, battery, or PCB) of the electronic device, the conductive material 303 may not come in proper contact with the conductive elements 302 of the flood sensing unit 301, and thus the elements may not be electrically connected to each other. To prevent this, the projection portions 310 or 310 and 320 that extend from the conductive elements 302 may be used to heighten the probability of electrical connection between the conductive elements.

Figure 3D:
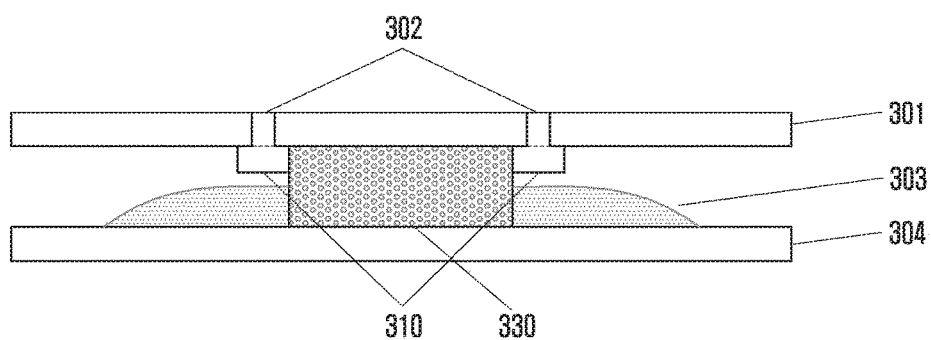

Referring to FIG. 3D, the flood sensing unit 301 may include one or more conductive elements 302, and the conductive elements 302 may be provided with projection portions 310. Further, to prepare for the case where the conductive material 303 is a fluid material, a non-conductive absorber 330 may be provided between the conductive elements 302. The non-conductive absorber 330, for example, a sponge, may absorb the conductive material 303 and even if movement of the electronic device occurs which could temporarily displace or relocate the conductive material 303, it can maintain the electrical connection between the conductive elements 302.

Figure 4:
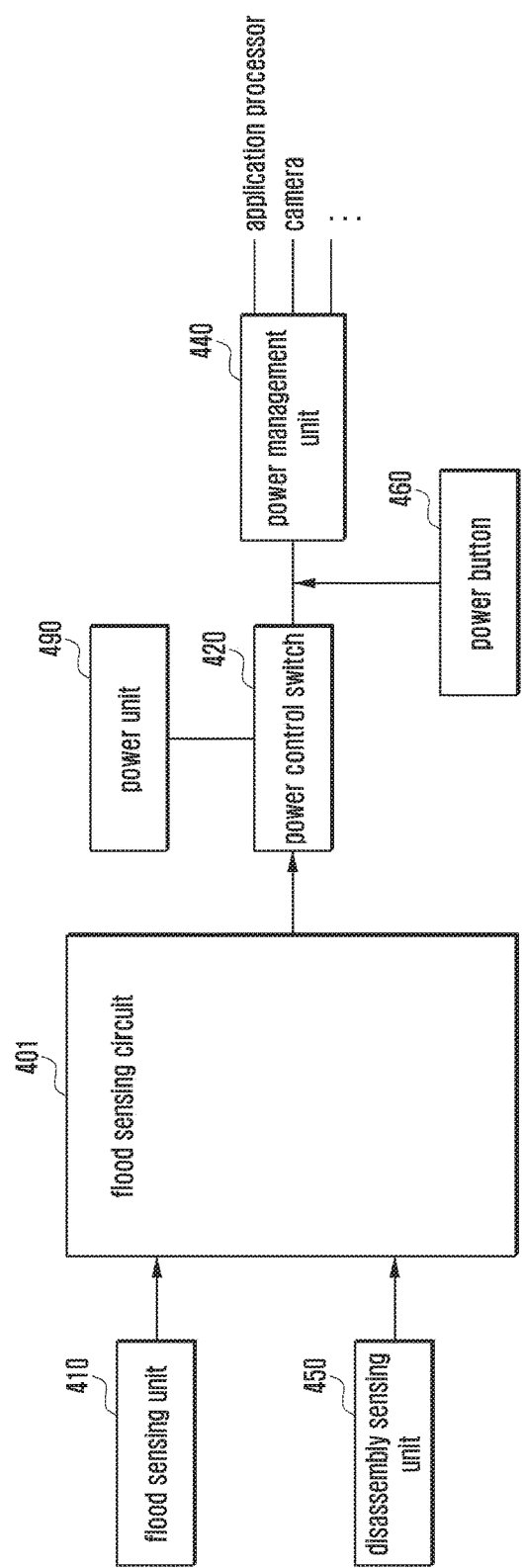
FIG. 4 is a block diagram according to various embodiments of the present disclosure.

FIG. 4 is a block diagram according to various embodiments of the present disclosure.

Figure 5:
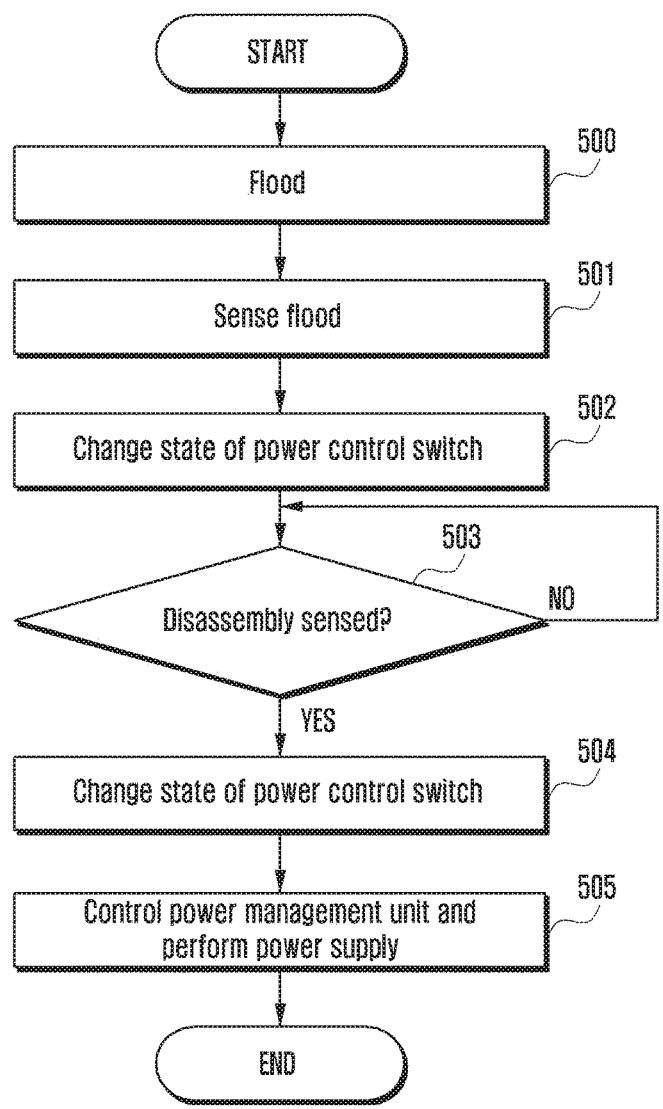
FIG. 5 is a flowchart according to various embodiments of the present disclosure.

FIG. 5 is a flowchart according to various embodiments of the present disclosure.

The circuits of FIGS. 2A to 2D may be presented in the block diagram of FIG. 4, and operations of the circuits of FIGS. 2A to 2D may be illustrated by the flowchart of FIG. 5.

Referring to FIGS. 4 and 5, at operation 500, if the electronic device is flooded, the components and the power unit may be shorted, or the power may be interrupted through a power interruption circuit. At operation 501, a flood sensing circuit 401 may sense the flooding through the flood sensing unit 410. If the flood sensing circuit 401 determines that the electronic device is flooded, the state of the power control switch 420 may be changed through the flood sensing circuit 401 at operation 502. That is, the power control switch 420 may be opened.

At operation 503, it may be confirmed whether the electronic device is disassembled through the disassembly sensing unit 450. If the disassembly of the electronic device is sensed, the flood sensing circuit 401 may change the state of the power control switch 420 at operation 504. That is, the power control switch 420 may be closed.

Through this, at operation 505, the power of the power unit 490 and the signal of the power button 460 may be transferred to the power management unit 440, and may be supplied to the components in the electronic device, such as an AP or a camera, through the power management unit 440. At operation 503, if the disassembly is not sensed, the disassembly sensing unit 450 may be in a standby state until the disassembly is sensed.

Figure 6:
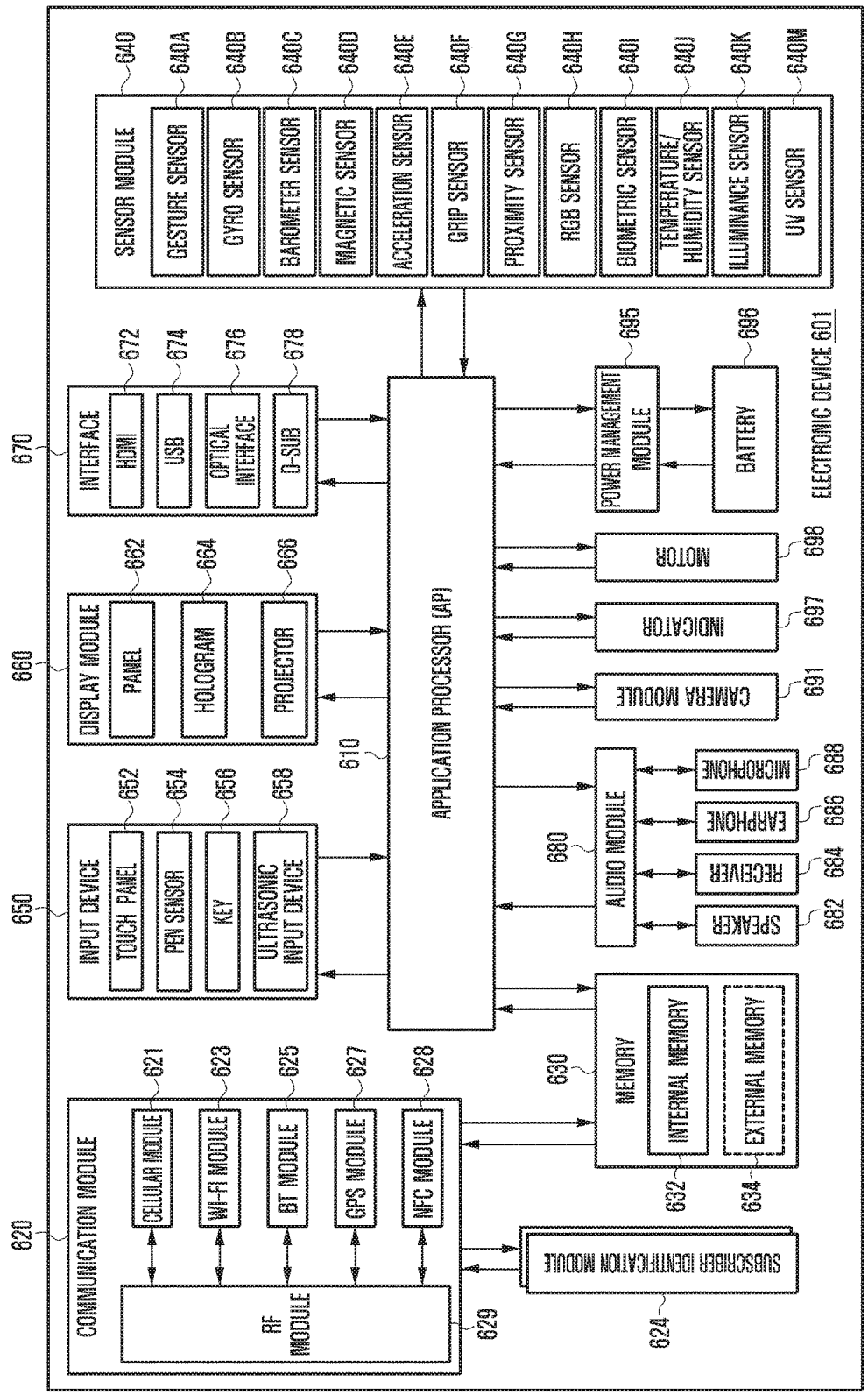
FIG. 6 is a block diagram of an electronic device according to various embodiments of the present disclosure.

FIG. 6 is a block diagram illustrating a configuration of an electronic device according to various embodiments of the present disclosure.

Referring to FIG. 6, an electronic device 601 may correspond to the entirety of the electronic device 101 or some part thereof. The electronic device 601 includes an AP 610, a communication module 620, a SIM card 624, a memory 630, a sensor module 640, an input device 650, a display module 660, an interface 670, an audio module 680, a camera module 691, a power management module 695, a battery 696, an indicator 697, and a motor 698.

The AP 610 may operate an operating system (OS) and/or application programs to control a plurality of hardware and/or software components connected to the AP 610, and perform data-processing and operations on multimedia data. For example, the AP 610 may be implemented in the form of system on chip (SoC). According to an embodiment of the present disclosure, the AP 610 may include a graphic processing unit (GPU) (not shown).

The communication module 620 may perform data communication with other electronic devices through a network. According to an embodiment of the present disclosure, the communication module 620 may include a cellular module 621, a Wi-Fi module 623, a Bluetooth (BT) module 625, a GPS module 627, a near field communication (NFC) module 628, and a radio frequency (RF) module 629.

The cellular module 621 is responsible for voice and video communication, text messaging, and internet access services through a communication network (e.g., long term evolution (LTE), LTE-advanced (LTE-A), code division multiple access (CDMA), wideband code division multiple access (WCDMA), Universal Mobile Telecommunications System (UMTS), wireless broadband (WiBro), and Global System for Mobiles (GSM) networks). The cellular module 621 may perform identification and authentication of electronic devices in the communication network using the SIM card 624. According to an embodiment of the present disclosure, the cellular module 621 may perform at least one of the functions of the AP 610. For example, the cellular module 621 may perform at least a part of the multimedia control function.

According to an embodiment of the present disclosure, the cellular module 621 may also include a communication processor (CP). The cellular module 621 may be implemented in the form of an SOC. Although the cellular module 621 (e.g., CP), the memory 630, and the power management module 695 are depicted as independent components separated from the AP 610, the present disclosure is not limited thereto, and may be embodied in a way that the AP includes at least one of the components (e.g., cellular module 621).

According to an embodiment of the present disclosure, each of the AP 610 and the cellular module 621 (e.g., CP) may load a command or data received from at least one of the components on a non-volatile or volatile memory, and process the command or data. The AP 610 or the cellular module 621 may store the processing results, data, or data received from other components or generated by at least one of the other components, in the non-volatile memory.

Each of the Wi-Fi module 623, BT module 625, GPS module 627, and NFC module 628 may include a processor for processing data each transmits/receives. Although the cellular module 621, Wi-Fi module 623, BT module 625, GPS module 627, and NFC module 628 are depicted as independent blocks, at least two of them (e.g., CP corresponding to the cellular module 621 and Wi-Fi processor corresponding to the Wi-Fi module 623) may be integrated in the form of an SoC.

The RF module 629 is responsible for data communication, e.g., transmitting/receiving RF signals. Although not depicted, the RF module 629 may include a transceiver, power amp module (PAM), frequency filter, and low noise amplifier (LNA). The RF module 629 also may include elements for transmitting/receiving electric waves in free space, e.g., conductor or conductive wires. Although FIG. 6 is directed to the case where the Wi-Fi module 623, BT module 625, GPS module 627, and NFC module 628 share the RF module 629, the present disclosure is not limited thereto, and may be embodied in a way that at least one of the Wi-Fi module 623, BT module 627, and NFC module 628 transmits/receives RF signals using an independent RF module.

The SIM card 624 may be designed so as to be inserted into a slot formed at a predetermined position of the electronic device. The SIM card 624 may store unique identity information (e.g., integrated circuit card identifier (ICCID)) or subscriber information (e.g., international mobile subscriber identity (IMSI)).

The memory 630 may include at least one of an internal memory 632 and an external memory 634. The internal memory 632 may include at least one of a volatile memory (e.g., dynamic random access memory (DRAM), static RAM (SRAM), synchronous dynamic RAM (SDRAM) or non-volatile memory (e.g., one time programmable read only memory (OTPROM), programmable ROM (PROM), erasable and programmable ROM (EPROM), electrically erasable and programmable ROM (EEPROM), mask ROM, flash ROM, NAND flash memory, and NOR flash memory)

According to an embodiment of the present disclosure, the internal memory 632 may be a solid state drive (SSD).

The external memory 634 may be a flash drive such as compact flash (CF), secure digital (SD), micro-SD, mini-SD, extreme Digital (xD), and Memory Stick. The external memory 634 may be functionally connected to the electronic device 601 through various interfaces. According to an embodiment of the present disclosure, the electronic device 601 may also include a storage device (or storage medium) such as hard drive.

The sensor module 640 may measure physical quantities or check the operation status of the electronic device 601, and convert the measured or checked information into an electric signal. The sensor module 640 may include at least one of gesture sensor 640A, gyro sensor 640B, barometric sensor 640C, magnetic sensor 640D, acceleration sensor 640E, grip sensor 640F, proximity sensor 640G, color sensor 640H (e.g., red, green, blue (RGB) sensor), biometric sensor 640I, temperature/humidity sensor 640J, illuminance sensor 640K, and ultra violet (UV) sensor 640M. Additionally or alternatively, the sensor module 640 may include an E-nose sensor (not shown), electromyography (EMG) sensor (not shown), electroencephalogram (EEG) sensor (not shown), electrocardiogram (ECG) sensor (not shown), (IR sensor (not shown), iris sensor (not shown), and fingerprint sensor (not shown). The sensor module 640 may further include a control circuit for controlling at least one of the sensors included therein.

The input device 650 may include a touch panel 652, a (digital) pen sensor 654, key(s) 656, and an ultrasonic input device 658. The touch panel 652 may be one of capacitive, resistive, infrared, or microwave-type touch panel. The touch panel 652 may also include a control circuit. In the case of a capacitive-type touch panel, it is possible to detect physical contact or contact approximation. The touch panel 652 may further include a tactile layer. In this case, the touch panel 652 may provide the user with haptic reactions.

The (digital) pen sensor 654 may be implemented with a sheet or separate recognition sheet to detect pen inputs in the same or similar way as touch inputs of the user. The keys 656 may include physical buttons, optical keys, and keypads. The ultrasonic input device 658 is a device capable of checking data by detecting sound waves through for example, a microphone 688, and may also be implemented for wireless recognition. According to an embodiment of the present disclosure, the electronic device 601 may also receive the user input made by means of an external device (e.g., computer or server) connected through the communication module 620.

The display 660 may include a panel 662, a hologram device 664, and a projector 666. The panel 662 may be a liquid crystal display (LCD) panel or an active matrix organic light emitting diodes (AMOLED) panel. The panel 662 may be implemented so as to be flexible, transparent, impact-resistant and/or wearable. The panel 662 may be implemented as a module integrated with the touch panel 652. The hologram device 664 may present 3-dimensional image in the air using interference of light. The projector 666 may project an image onto a screen. The screen may be placed inside or outside of the electronic device. According to an embodiment of the present disclosure, the display 660 may also include a control circuit for controlling the panel 662, hologram device 664, and projector 666.

The interface 670 may include a high-definition multimedia interface (HDMI) 672, a universal serial bus (USB) 674, an optical interface 676, and a D0subminiature (D-sub) 678. Additionally or alternatively, the interface 670 may include a mobile high-definition link (MHL) interface, an SD/MMC card interface, and an infrared data association (irDA) standard interface.

The audio module 680 may convert sound into an electric signal and vice versa. The audio module 680 may process the audio information input or output through a speaker 682, a receiver 684, an earphone 686, and the microphone 688.

The camera module 691 is a device capable of taking still and motion pictures and, according to an embodiment of the present disclosure, includes at least one image sensor (e.g., front and rear sensors), a lens (not shown), an image signal processor (ISP) (not shown), and a flash (e.g., LED or xenon lamp) (not shown).

The power management module 695 may manage the power of the electronic device 601. Although not shown, the power management module 695 may include a power management integrated circuit (PMIC), a charger integrated circuit (IC), a battery, and a battery or fuel gauge.

The PMIC may be integrated into an IC or SoC semiconductor. The charging may be classified into wireless charging and wired charging. The charger IC may charge the battery and protect the charger against overvoltage or overcurrent. According to an embodiment of the present disclosure, the charger IC may include at least one of wired charger and wireless charger ICs. Examples of a wireless charging technology includes resonance wireless charging, acoustic wireless charging, and electromagnetic wave wireless charging. Where required, the electronic device 601 further includes extra circuit components for wireless charging such as coil loops, resonance circuits, and diodes.

The battery gauge may measure the residual power of the battery 696, charging voltage, current, and temperature. The battery 696 may store or generate power and supply the stored or generated power to the electronic device 601. The battery 696 may include a rechargeable battery or a solar battery.

The indicator 697 may display an operation status of the electronic device 601 or a part of the electronic device, booting status, messaging status, and charging status. The motor 698 may convert the electronic signal into mechanical vibration. Although not shown, the electronic device 601 may also include a processing unit (e.g., GPU) for supporting mobile TV. The processing unit for supporting the mobile TV may be able to process the media data abiding by the broadcast standards such digital multimedia broadcasting (DMB), digital video broadcasting (DVB), and media flow.

The above enumerated components of the electronic device of the present disclosure may be implemented into one or more parts, and the names of the corresponding components may be changed depending on the kind of resulting electronic device. The electronic device of the present disclosure may include at least one of the aforementioned components with omission or addition of some components. The components of the electronic device of the present disclosure may also be combined selectively into a single entity to perform the functions of the components equally as before the combination.

The term "module" according to the embodiments of the disclosure, means, but is not limited to, a unit of software, hardware, or firmware, or any combination thereof. The term "module" may also be used interchangeably with the terms "unit," "logic," "logical block," "component," or "circuit." The term "module" may denote a smallest unit of a component or part thereof. The term "module" may also be the smallest unit for performing at least one function or part thereof. A module may be implemented mechanically, electronically, or by combination thereof. For example, a module may include at least one of application-specific integrated circuit (ASIC) chip, field-programmable gate arrays (FPGAs), and programmable-logic device that are known or to be developed.

While the present disclosure has been shown and described with reference to various embodiments thereof, it will be understood by those skilled in the art that various changes in form and detail may be made therein without departing from the spirit and scope of the present disclosure as defined by the appended claims and their equivalents.

What is claimed is:

1. An electronic device, comprising:
  a power unit configured to supply power and a signal corresponding to the power;
  a power management unit configured to:
    receive a supply of power from the power unit, and distribute the supplied power;
  a sensing unit;
  a control circuit comprising a first switch and a logical operation unit; and
  a power control switch configured to switch electrical connection between the power unit and the power management unit based on a signal received from the control circuit,
  wherein the control circuit is configured to:
    control, in response to receiving a first sensing signal, the first switch to output a control signal to the logical operation unit,
    control, in response to the output signal from the first switch, the logical operation unit to output a signal for deactivating a power supply from the power unit to the power management unit to the power control switch based on the control signal, and to output a signal for deactivating the first switch to the first switch based on the control signal, and
    control, in response to the signal for deactivating the first switch, the first switch to maintain a deactivated state when a second sensing signal is received from the sensing unit, and
  wherein the first sensing signal is received from the sensing unit when sensing a flood of electronic device and the second sensing signal is received from the sensing unit when the flood of electronic device is not sensed.

2. The electronic device of claim 1, wherein the sensing unit comprises at least two conductive elements configured to electrically respond to flooding in the electronic device.

3. The electronic device of claim 2, wherein one of the at least two conductive elements further comprises a resistor.

4. The electronic device of claim 2, wherein one of the at least two conductive elements further comprises an inductor.

5. The electronic device of claim 1, wherein the sensing unit further comprises a non-conductive absorber.

6. The electronic device of claim 1, wherein the sensing unit further comprises a projection shape configured to alter a contact profile of at least one of the conductive elements.

7. The electronic device of claim 1, wherein the sensing unit is disposed adjacent to at least one opening in a housing of the electronic device.

8. An electronic device for controlling a power supply, comprising:
  a power unit configured to supply power and a signal corresponding to the power;
  a power management unit configured to:
    receive a supply of power from the power unit, and distribute the supplied power;
  a first sensing unit configured to sense flooding of the electronic device;
  a control circuit comprising a first switch and a logical operation unit;
  a power control switch configured to switch electrical connection between the power unit and the power management unit based on a signal received from the control circuit; and
  a second sensing unit configured to sense a disassembly of at least a part of the electronic device;
  wherein the control circuit is configured to:
    control, in response to receiving a first sensing signal from the first sensing unit, the first switch to output a control signal to the logical operation unit,
    control, in response to the output signal from the first switch, the logical operation unit to output a signal for deactivating a power supply from the power unit to the power management unit to the power control switch based on the control signal, and to output a signal for deactivating the first switch to the first switch based on the control signal,
    control, in response to the signal for deactivating the first switch, the first switch to maintain a deactivated state when a second sensing signal is received from the sensing unit, and
    control, in response to receiving a disassembly sensing signal from the second sensing unit, the logical operation unit to output a signal for activating a power supply from the power unit to the power management unit to the power control switch, and
  wherein the first sensing signal is received from the first sensing unit when sensing a flood of electronic device and the second sensing signal is received from the first sensing unit when the flood of electronic device is not sensed.

9. The electronic device of claim 8, wherein the second sensing unit is further configured to sense a removal of at least one of a battery cover of the electronic device, a housing, and a fixing portion for fixing the housing.

10. The electronic device of claim 8, wherein the control circuit comprises at least one switch.

11. The electronic device of claim 8, wherein the control circuit comprises at least one logical operation unit.

12. The electronic device of claim 11, wherein the logical operation unit comprises an OR gate.

13. The electronic device of claim 8, wherein the control circuit is disposed adjacent to at least one opening in a housing of the electronic device.

14. A method for controlling a power supply to an electronic device, comprising:
  controlling, in response to receiving a first sensing signal from a first sensing unit, a first switch of a control circuit to output a control signal to a logical operation unit;
  controlling, in response to the output signal from the first switch, the logical operation unit to output a signal for deactivating a power supply from the power unit to the power management unit to a power control switch based on the control signal;
  deactivating the power supply from the power unit to the power management unit based on the signal for deactivating;
  controlling the logical operation unit to output a signal for deactivating the first switch to the first switch based on the control signal; and controlling, in response to the signal for deactivating the first switch, the first switch to maintain a deactivated state when a second sensing signal is received from the first sensing unit, wherein the first sensing signal is received from the first sensing unit when sensing a flood of electronic device and the second sensing signal is received from the first sensing unit when the flood of electronic device is not sensed.

15. The method of claim 14, further comprising:
sensing whether at least a part of the electronic device is disassembled through a second sensing unit; and
activating the power supply if a disassembly of the at least a part of the electronic device is sensed.

16. The method of claim 15, further comprising:
confirming, if the power supply is activated, whether a power button is input; and
providing the power supply to the electronic device if the power button is input.

17. The method of claim 16, wherein the activating of the power supply comprises:
controlling a logic operation unit to receive an input of a signal corresponding to a first level from the second sensing unit;
controlling a power control switch to receive an input of the signal corresponding to the first level from the logic operation unit; and
activating the power supply by activating a power management unit through the power control switch.

18. The method of claim 15, wherein the sensing of the disassembly comprises:
sensing that a signal output through the second sensing unit is transitioned from a signal corresponding to a second level, to a signal corresponding to a first level.

19. The method of claim 15, wherein the sensing of the disassembly comprises:
sensing the disassembly of the electronic device if a signal that is output through the second sensing unit is transitioned from a signal corresponding to a second level, to a signal corresponding to a first level.

* * * * *